(12) United States Patent
Eckel et al.

(10) Patent No.: US 6,280,330 B1
(45) Date of Patent: Aug. 28, 2001

(54) TWO-MASS FLYWHEEL WITH A SPEED-ADAPTIVE ABSORBER

(75) Inventors: Hans-Gerd Eckel, Laudenbach; Lydia Weiss, Wiesloch, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/347,600

(22) Filed: Jul. 1, 1999

(30) Foreign Application Priority Data

Jul. 11, 1998 (DE) .............................................. 198 31 158

(51) Int. Cl.[7] ...................................................... F16D 3/10
(52) U.S. Cl. .................................. 464/3; 464/68; 74/574
(58) Field of Search .......................... 464/3, 68; 192/201; 188/378, 379; 74/574

(56) References Cited

U.S. PATENT DOCUMENTS

| 4,171,029 | * | 10/1979 | Beale | 475/267 X |
| 4,732,250 | * | 3/1988 | Maucher et al. | 464/68 X |
| 5,697,845 | * | 12/1997 | Curtis | 464/68 X |
| 5,884,735 | * | 3/1999 | Eckel et al. | 188/378 |
| 6,095,304 | * | 8/2000 | Eckel | 74/574 X |
| 6,109,134 | * | 8/2000 | Sudau | 74/574 |

FOREIGN PATENT DOCUMENTS

| 36 21 991 | 1/1988 | (DE) . |
| 36 21 997 | 1/1988 | (DE) . |
| 196 31 989 | 9/1997 | (DE) . |
| 1490-346 | * 6/1989 | (RU) | 74/574 |

* cited by examiner

Primary Examiner—Lynne H. Browne
Assistant Examiner—Greg Binda
(74) Attorney, Agent, or Firm—Kenyon & Kenyon

(57) ABSTRACT

A flywheel, including a first rotating ring that is connectible to a drive shaft and a second rotating ring that is connectible to a driven shaft. The first and the second rotating rings are twistable relative to one another and are supported concentrically one inside the other. Provision is made between the first and the second rotating ring for a torsion spring to suppress torsional vibrations. A speed-adaptive absorber is affixed to the second rotating ring, the speed-adaptive absorber including at least one hub part that is rotatable about an axis of rotation, as well as a plurality of damper masses which are able to swivel at least in the circumferential direction about swivel axes that are set apart from the axis of rotation.

19 Claims, 3 Drawing Sheets

TWO-MASS FLYWHEEL WITH A SPEED-ADAPTIVE ABSORBER

FIELD OF THE INVENTION

The present invention relates to a flywheel of the type having a first rotating ring that is connectible to a drive shaft and a second rotating ring that is connectible to a driven shaft. The first and the second rotating rings are twistable relative to one another and are supported concentrically one inside the other. A torsion spring is located between the first and the second rotating rings to suppress torsional vibrations.

BACKGROUND INFORMATION

A flywheel of this type is described in the German patent 36 21 997 A1.

Such a flywheel, divided into two parts, which is also known as a two-mass flywheel, is used, for example, to isolate vibrations in the drive train of a motor vehicle.

The disadvantage of a flywheel such as is described in DE 36 21 991 A1 is its great weight, which is essentially determined by the two rotating rings. In order to make it possible to achieve good vibrational isolation using the two-mass flywheel, the second rotating ring mounted on the gearing side is considerably heavier than the first rotating ring on the engine side.

The German patent 196 31 989 C1 describes a speed-adaptive dynamic-vibration absorber. It includes a hub part, upon which are located a number of inertial masses, adjacent in the circumferential direction, that are supported in each case in two mounting supports adjacent in the circumferential direction. These include bolts that can roll in such a way on oppositely curved paths of the inertial-mass elements and of the hub part that, in response to the introduction of torsional vibrations superimposed on a rotational motion, a decrease results in the distance of the inertial-mass elements from the axis in the course of curved paths of motion.

SUMMARY OF THE INVENTION

An object of the present invention is to reduce the weight of a two-mass flywheel and, in particular, to permit a lighter type of construction of a drive train.

This objective is achieved in a flywheel of the type noted above by securing a speed-adaptive absorber to the second rotating ring, the speed-adaptive absorber including at least one hub part that is rotatable about the axis of rotation, as well as a plurality of damper masses which are able to swivel at least in the circumferential direction about swivel axes that are set apart from the axis of rotation.

The speed-adaptive damper provided at the second rotating ring makes it possible to reduce torsional vibrations which occur at shafts of periodically operating machines, e.g., at the crank shaft of a combustion engine, and which are superimposed on the rotational motion. A damper is designated as speed-adaptive when it is able to cancel the torsional vibrations over a greater speed range, ideally over the entire speed range of the machine. The principle underlying the absorber is that, upon introduction of a rotary motion, the damper masses endeavor to circle the axis at the greatest possible distance due to centrifugal force. Torsional vibrations which are superimposed on the rotary motion lead to a relative movement of the damper masses inwardly in the radial direction, which is utilized for the dynamic-vibration absorption. The dynamic-vibration absorber has a natural frequency which is proportional to the speed of rotation, so that torsional vibrations having frequencies which are proportional to the speed of rotation are able to be canceled over a large rotational-speed range.

Surprisingly however, due to the arrangement of a speed-adaptive absorber at or on the second rotating ring of a two-mass flywheel, the flywheel can have a considerably lighter design. The attainable savings in weight is attributable primarily to the fact that the arrangement of the present invention makes it possible to achieve an improvement in the vibration response, although the second rotating ring is substantially lighter. However, due to other technical requirements, for example, for reasons of heat absorption and dissipation, the mass of the second rotating ring cannot be reduced arbitrarily. A further advantage of the invention is that materials different from those used till now can be utilized for the second rotating ring. Because the second rotating ring can be made of sheet metal, for example, production costs for the flywheel can be reduced.

The absorber is advantageously mounted on the output side (i.e., the power take-off side)of a prime mover or driven machine.

Good dynamic-vibration absorption is attained because the absorber is arranged on the front end of the flywheel opposite the output.

The arrangement of a coupling driving disk with a pressure plate between the second rotating ring and the absorber permits a particularly compact and space-saving type of construction.

The construction is simplified by providing a pressure spring which acts on the pressure plate and is braced against the absorber.

According to one particularly advantageous refinement, each absorber mass is supported in the hub part by two bolts that are set apart from each other in the circumferential direction and extend parallel to the axis of rotation. The bolts are able to roll on curved paths which, in the region of the hub part, have a profile that is open in a U-shape in the direction of the axis of rotation, and in the area of the absorber masses, have a profile that is open in a U-shape in the opposite direction. The bolts are guided through a guideway on the sides facing away from the respective curved paths. A particularly simple and stable construction is achieved by mounting the absorber masses on bolts which roll on curved paths of the hub part and of the absorber mass.

The noise characteristic is improved because the guideway is made of a damping layer composed of a polymer material.

The damping capacity is particularly good when the damping layer is made of an elastomer material.

The damping layer advantageously ends, in the circumferential direction on both sides, in stop faces which limit the circumferential mobility of the bolts to a fixed value.

Production is simplified and reduced in cost because the curved paths form a component of inserts.

The inserts and the damping layers advantageously form a component of insertion parts which are immovably accommodated in openings of the hub part and of the absorber masses.

Production is also simplified because, after the insertion of the inserts into the openings, the material member forming the damping layer is directly joined to the openings and the inserts, forming a solid bond.

It is only necessary to place small demands on the manufacturing tolerances if a free space is provided between the absorber mass or hub and the inserts, and the free space is filled with the material of the damping layer and forms a tolerance-adjustment layer.

If the tolerance-adjustment layer and the damping layer are configured integrally and continuously with one another, they can be produced in one work step.

The inserts can be inexpensively produced by extrusion.

BRIEF DESCRIPTION OF THE DRAWINGS

The invention will now be further explained with reference to the drawings, in which.

DETAILED DESCRIPTION OF THE INVENTION

Figure 1:
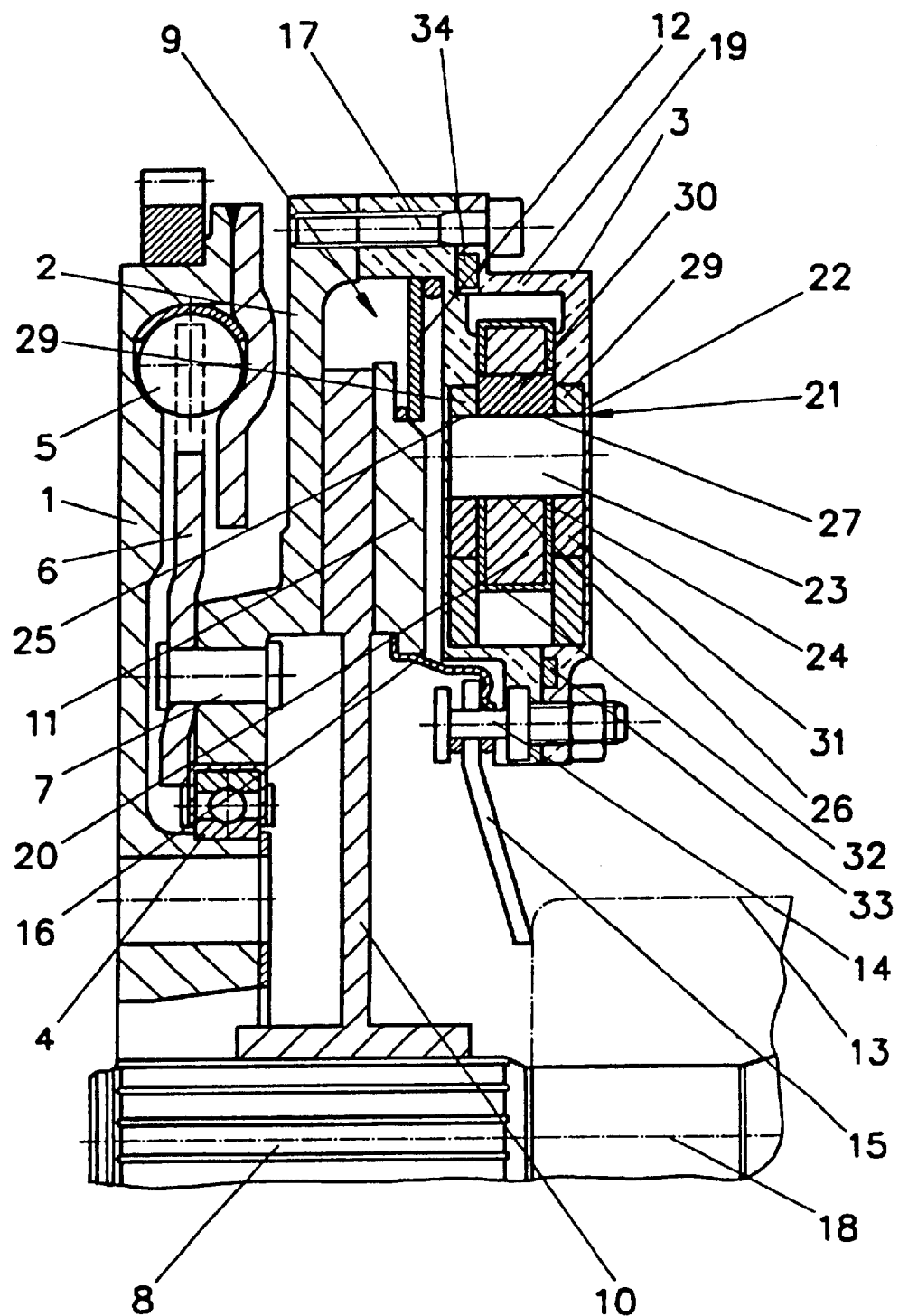
FIG. 1: is a cross-sectional view of a flywheel constructed according to the principles of the invention, having a speed-adaptive absorber.

FIG. 1 shows a flywheel constructed according to the principles of the present invention, which has a first rotating ring 1, a second rotating ring 2, and a speed-adaptive absorber 3 affixed to second rotating ring 2.

The first rotating ring or rotating mass 1 is connectible to a drive shaft, not shown, such as to a crank shaft of a motor-vehicle engine. The second rotating ring or rotating mass 2 is supported on the first rotating ring 1 via a ball bearing 4, so that first and second rotating rings 1, 2 are twistable relative to one another and are mounted concentrically one inside the other. A torsion spring 5 is provided between the first and second rotating rings 1, 2 to suppress torsional vibrations. Torsion spring 5 is connected to second rotating ring 2 via connecting element 6 and bolt 7. Second rotating ring 2 is connectible to a driven shaft 8 which, for example, can be constructed as a clutch shaft.

In the specific embodiment of the invention shown in FIG. 1, the second rotating ring 2 is joined to the driven shaft 8 by way of a coupling 9. It is arranged in the axial direction of shaft 8 between second rotating ring 2 and speed-adaptive absorber 3, resulting in a particularly compact type of construction. The coupling 9 has a coupling driving disk 10 which is pressed against second rotating ring 2 by a pressure spring 12 via a pressure plate 11. Coupling 9 can be raised, in that a releasing device, whose bearing is indicated by dotted line 13, shifts lever part 15 supported in counter-bearing 14. In this manner, the pressure plate 11, by way of actuating element 16 joined to lever part 15, is removed from coupling the driving disk 10 against the force of pressure spring 12. Absorber 3 is mounted on second rotating ring 2 by way of screws 17 in such a way that pressure spring 12 is braced against absorber 3. In the illustrated embodiment, the absorber 3 is arranged on the end of the second rotating ring opposite the output. Moreover, counter-bearing 14 with lever part 15 is arranged at the inner end of absorber 3 in the radial direction. Advantageously, the absorber 3 is mounted on the output side (i.e., the power take-off side) of a prime mover or driven machine as shown here.

Speed-adaptive absorber 3 is designed as a torsional-vibration canceller, and has at least one hub part 19 that is rotatable about an axis of rotation 18, as well as a plurality of absorber masses 20. For each absorber mass 20, hub part 19 in each case has two mounting supports 21, adjacent in the circumferential direction, to support absorber masses 20 on hub part 19.

Each mounting support 21 is formed by an opening 22 in hub part 19 and a bolt 23 accommodated therein. Bolt 23, whose longitudinal axis runs parallel to axis 18 of hub part 19, extends in an opening 24, formed as a cutout, in absorber mass 20.

Hub part 19 has a curved path 25 delimiting opening 22, and absorber mass 20 has a curved path 26 delimiting opening 24. Curved paths 25, 26 and bolt 23 are designed and arranged in such a way that absorber masses 20 can move relative to hub part 19, executing a pendulum motion. In so doing, bolt 23 rolls on curved paths 25, 26 which are inversely curved. Curved path 25 in hub part 19 points in the direction of axis 18, while curved path 26 in absorber mass 20 points outwardly, away from axis 18. In this manner, the absorber masses 20 are able to swivel about swivel axes.

Figure 2:
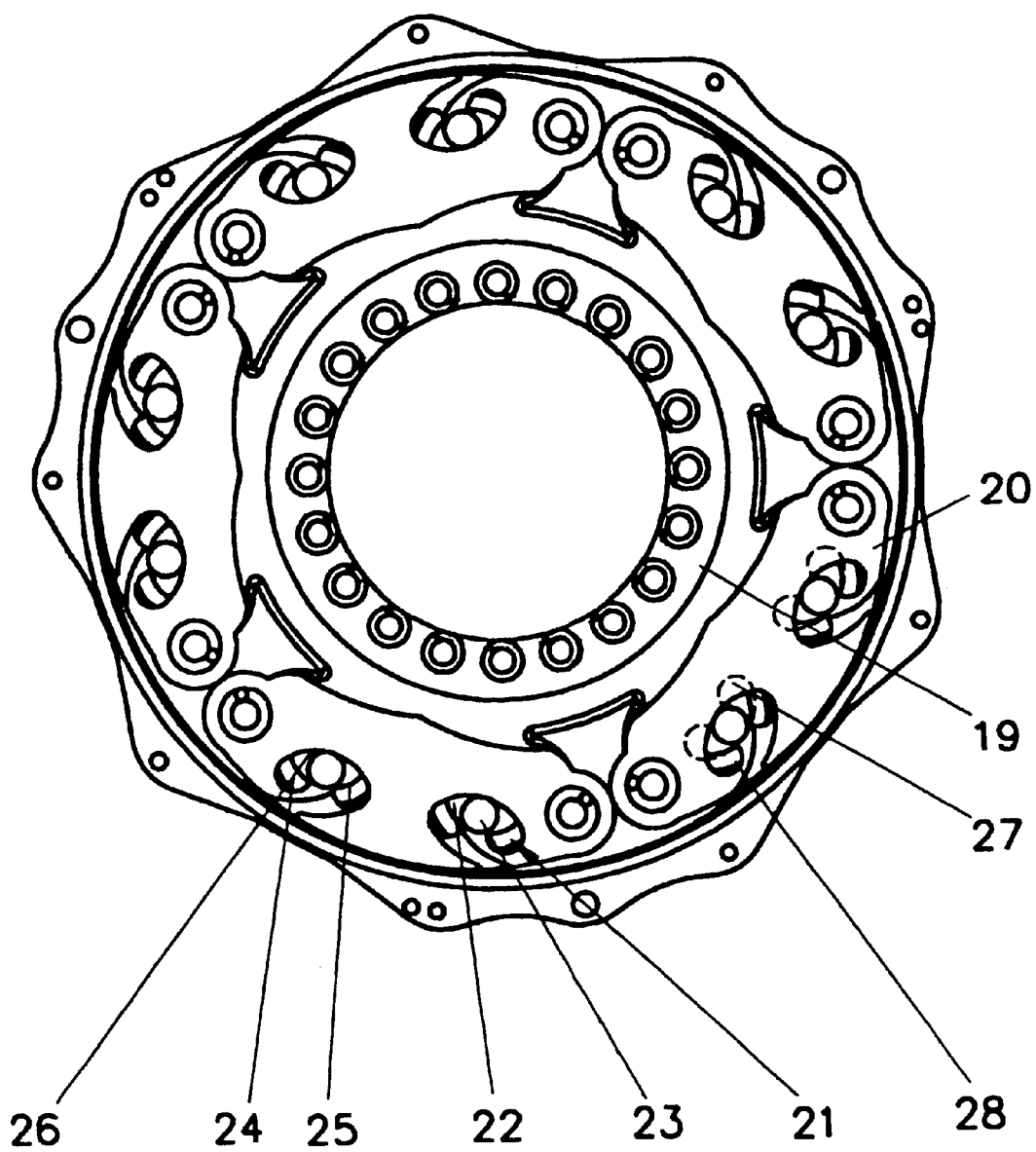
FIG. 2: is a front view of a speed-adaptive absorber of the present invention according to a further specific embodiment.
Figure 3:
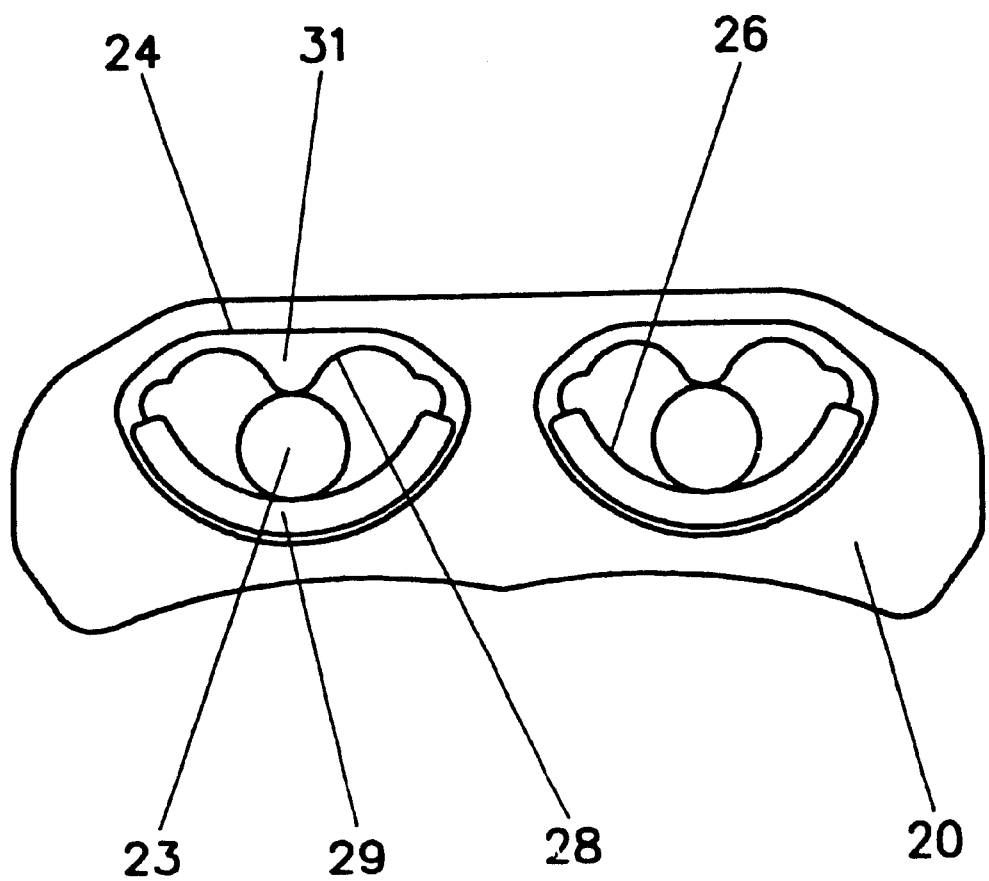
FIG. 3: shows a front view of an absorber mass according to the present invention.

In response to the occurrence of a torsional vibration superimposed on a rotational movement of the shaft, absorber masses (i.e. inertial masses) 20 are moved out of their mid-position relative to hub part 19, shown in FIG. 2, along a curved path of motion which is determined by curved paths 25, 26 and bolt 23. In this manner, the distance of absorber masses 20 from axis 18 is reduced, thus counteracting torsional vibrations on the basis of the absorber principle.

Moreover, absorber masses 20 have guideways 27 lying opposite curved paths 26 in opening 24, so that opening 24 receives the shape of a U which is directed away from axis 18. Corresponding guideways opposite curved paths 25 are also formed in mounting support 21 of hub part 19 shown in phantom in FIG. 2).

Curved paths 25, 26 and guideways 27, 28 form components of insertion parts 29, 30 which are undetachably accommodated in hub part 19 or absorber masses 20. Insertion parts 29, 30 can also be inserted loosely at first, and bonded to hub part 19 or inertial masses 20 by subsequent molding of layer 31, 32 bearing guideways 27, 28. Damping layer 31 is composed of a polymer material to obtain desirable noise characteristics. An elastomer material provides particularly good characteristics. The damping layer 31 has sides. In the circumferential direction on each of its sides, the dampening layer 31 ends in stop faces which limit the circumferential movement of the bolts to a fixed value. A free space can be provided between the absorber mass and the hub, and the inserts. The free space can be filled with the material of the damping layer and form a tolerance-adjustment layer 32. The tolerance-adjustment layer 32 and the damping layer can be configured integrally and continuously with one another. The insertion parts 29, 30 can be produced by extrusion.

Hub part 19 is formed in two parts, the hub parts surrounding the absorber masses on both sides. Both hub parts 19 are sealed off relatively to each other by gaskets 33, 34.

What is claimed is:

1. A flywheel, comprising:
    a first rotating ring that is connectible to a drive shaft;
    a second rotating ring that is connectible to a driven shaft, the first and the second rotating rings being twistable relative to one another and being supported concentrically one inside the other about an axis of rotation;
    a torsion spring for the suppression of torsional vibrations, said torsion spring being located between the first and the second rotating rings;
    a speed-adaptive absorber, affixed to the second rotating ring, the speed-adaptive absorber comprising at least one hub part that is rotatable about the axis of rotation, as well as a plurality of absorber masses which are able to circumferentially swivel about swivel axes that are set apart from the axis of rotation wherein each absorber mass is supported in the hub part by two bolts that are spaced apart from each other in the circumferential direction and which extend parallel to the axis of rotation, the bolts being able to roll on curved paths which, in the region of the hub part, have a profile that is open in a U-shape in the direction of the axis of rotation, and which, in the area of the absorber masses, have a profile that is open in a U-shape in the opposite direction; the bolts being guided through a guideway on the sides facing away from the respective curved paths.

2. The flywheel as recited in claim 1, wherein the speed-adaptive absorber is mounted on the driven side of a prime mover or driven machine.

3. The flywheel as recited in claim 1, wherein the speed-adaptive absorber is arranged on the end of the second rotating ring opposite an output.

4. The flywheel as recited in claim 3, wherein a coupling driving disk with a pressure plate is arranged between the second rotating ring and the absorber.

5. The flywheel as recited in claim 1, wherein a coupling driving disk with a pressure plate is arranged between the second rotating ring and the absorber.

6. The flywheel as recited in claim 5, further comprising a pressure spring, acting on the pressure plate, which is braced against the absorber.

7. The flywheel as recited in claim 1, wherein the guideway is made of a damping layer composed of a polymer material.

8. The flywheel as recited in claim 7, wherein the damping layer is made of an elastomer material.

9. A The flywheel as recited in claim 7, wherein the damping layer has sides and ends, in the circumferential direction on each of its sides, in stop faces which limit the circumferential movement of the bolts to a fixed value.

10. The flywheel as recited in claim 9, wherein the curved paths form a component of inserts.

11. The flywheel as recited in claim 10, wherein the inserts and the damping layer form a component of insert parts which are immovably accommodated in openings of the hub part and openings of the plurality of absorber masses.

12. The flywheel as recited in claims 11, wherein, after the insertion of the inserts into the openings, a material member forming the damping layer is directly joined to the openings and to the inserts, forming a solid bond.

13. The flywheel as recited in claim 11, wherein a free space is provided between one of an absorber mass and the hub, and the inserts, and wherein the free space is filled with the material of the damping layer and forms a tolerance-adjustment layer.

14. The flywheel as recited in claim 13, wherein the inserts are produced by extrusion.

15. The flywheel as recited in claim 10, wherein a free space is provided between one of an absorber mass and the hub, and the inserts, and wherein the free space is filled with the material of the damping layer and forms a tolerance-adjustment layer.

16. The flywheel as recited in claim 15, wherein the tolerance-adjustment layer and the damping layer are configured integrally and continuously with one another.

17. The flywheel as recited in claim 15, wherein the inserts are produced by extrusion.

18. The flywheel as recited in claim 1, wherein the curved paths form a component of inserts.

19. The flywheel as recited in claim 18, wherein the inserts are produced by extrusion.

* * * * *